E. L. SCHUMACHER.
OPHTHALMIC MOUNTING AND METHOD OF MAKING SAME.
APPLICATION FILED DEC. 4, 1919.
1,401,283.  Patented Dec. 27, 1921.
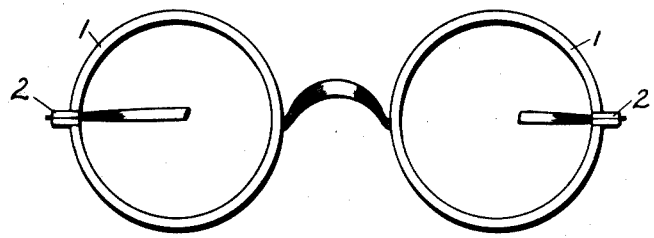
FIG. I
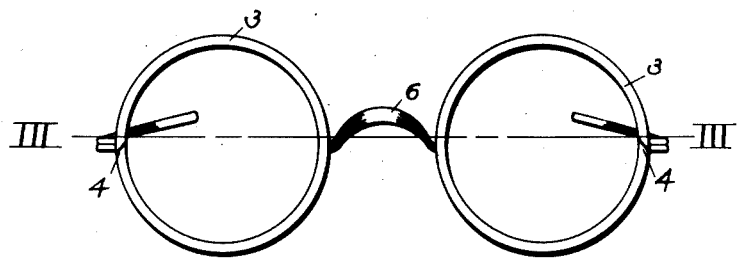
FIG. II
FIG. III
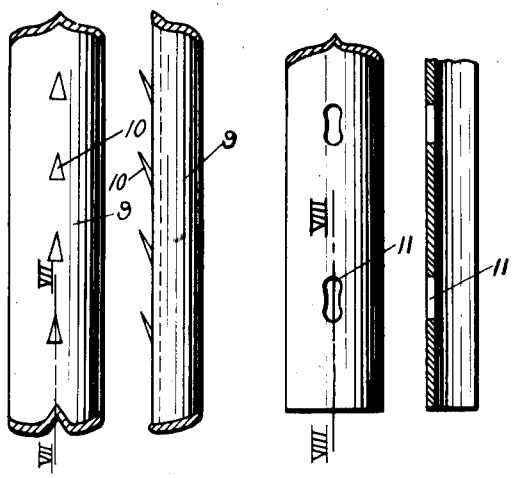
FIG. IV    FIG. V
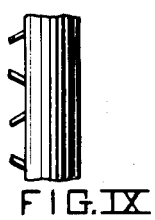
FIG. IX
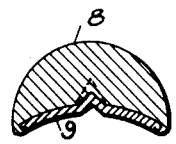
FIG. VI
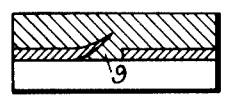
FIG. VII
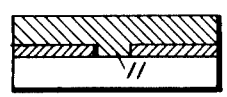
FIG. VIII
INVENTOR
ELMER L. SCHUMACHER
BY
H. H. Styll  A. K. Parsons
ATTORNEYS

UNITED STATES PATENT OFFICE.

ELMER L. SCHUMACHER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING AND METHOD OF MAKING SAME.

1,401,283.      Specification of Letters Patent.      Patented Dec. 27, 1921.

Application filed December 4, 1919. Serial No. 342,440.

*To all whom it may concern:*

Be it known that I, ELMER L. SCHUMACHER, a citizen of the United States, residing at Southbridge, in the county of Worcester and State of Massachusetts, have invented certain new and useful Improvements in Ophthalmic Mountings and Methods of Making Same, of which the following is a specification.

This invention relates to an improved rim or eye wire for ophthalmic mountings and an improved process of making the same, and has particular reference to a composite rim or eye wire composed of metallic and non-metallic parts.

The principal object of the invention is to provide a composite eye wire or rim of metal and zylonite that will be securely held together without the use of external fastening devices.

Other objects of the invention are to provide a process that will securely form the two rims together without external securing devices, and to maintain the unmarred appearance of the zylonite rim.

Other objects and advantages should be readily apparent by reference to the following specifications taken in connection with the drawings, and it will be understood that any modifications or departures may be made from the specific features disclosed within the scope of the claims without departing from the spirit of the invention, the preferred form only being shown for convenience of illustration.

Figure I represents a front view of a pair of spectacles embodying the invention.

Fig. II represents a front view of a pair of spectacles embodying the invention, the rims being continuous.

Fig. III represents a sectional view on line III—III of Fig. II.

Fig. IV represents inside and side views of the metallic rim in one form of the invention.

Fig. V represents inside and side views, the side view in section, of the metallic rim in another form of the invention.

Fig. VI represents a cross section through the zylonite and metallic rims.

Fig. VII represents a longitudinal cross section through the zylonite and metal rims on line VII—VII of Fig. IV.

Fig. VIII represents a longitudinal cross section through the zylonite and metal rims on line VIII—VIII of Fig. V.

Fig. IX represents a view similar to Fig. IV showing another form of projection on the face of the metallic rim.

Combined metal and zylonite rims for spectacles and eyeglasses have had quite a very large use in the past year or so. In the best forms of these mountings the zylonite has been held in place on the metal rim by means of staples or screws at the ends. The breakage has, however, been large due to the tendency of zylonite to warp, twist, and shrink. It is the prime object of my invention to overcome these difficulties, to do away with external holding devices, and to obtain a clear, unmarred surface for the zylonite rim.

Fig. I shows a spectacle having composition rims 1, terminating at the end pieces 2. In Fig. II the composite rims are continuous, being joined at the flush seam 4. This construction is obtained by the features shown in Fig. III. The metal rims are connected by the bridge 6, which is offset out of the way of the zylonite rim. The end pieces 7 are also offset and attached to the metal rim 5 in such a way as to allow the zylonite rim to be continuous past the connection.

In the invention the zylonite rim 8 is superimposed on the metal rim 9, Fig. VI, in the usual way, both rims being of the usual form. In the metal rim 9, however, see Fig. IV, prongs 10 are cut out and pressed outwardly therefrom, or, if desired, recesses 11 only are cut out, as shown in Fig. V. The zylonite rim 8 is next prepared to fit the metal rim 9, then heated and pressed in place around the metal rim. The heat softens the zylonite, making it plastic, and the pressure forces the zylonite around the prongs 10 and into the recesses from which the prongs are cut out, as shown in Fig. VII, or if recesses only have been cut in the metal rim the zylonite is forced into the recess 11, as shown in Fig. VIII. This process of forcing the heated zylonite rim over the metal one intimately unites the two rims into interlocking union, and gives a strong non-releasing connection and a beautiful smooth, clear, unmarred external appearance to the zylonite.

If desired, both prongs and recesses may be used at the same time. The metal rim may also be roughened or scored to assist in the uniting process and to prevent creeping or crawling of the zylonite on the metal.

From the foregoing description it will be seen that I have provided a composite metal and zylonite rim itimately secured together with an unmarred external surface.

It will be understood that by zylonite I mean and include any and all compositions that have a smooth surface and may be worked under the influence of heat to assume the desired form and will then cool to the desired form, or that may be put on in liquid form and allowed to harden to the final desired form.

It will also be clear that other forms of projections or prongs may be used than the cut and pressed ones shown in Fig. IV. In Fig. IX, I have shown the projections as inclined to form dove-tails, and also as rising solidly from the surface of the metal rim without perforation.

It will also be clear that instead of pressing heated zylonite or an equivalent over the metal rim, I can reach the same results by coating the metal rim with liquid celluloid or like preparation and allowing it to harden. If necessary several coats of the liquid may be put on until the desired thickness and finish is reached. The liquid will fill in and surround the holes and projections in manner similar to the plastic coating.

I claim:

1. The process of making a composite rim for ophthalmic mountings comprising preparing a metal rim with cut prongs pressed up therefrom, preparing a composition non-metallic rim to fit around the metal one, heating the composition rim, pressing the heated composition rim on the metal rim around the prongs.

2. The process of making a composite rim for ophthalmic mountings comprising preparing a metal rim with cut prongs pressed up therefrom, preparing a composition non-metallic rim to fit around the metal one, heating the composition rim, pressing the heated composition rim on the metal rim around the prongs, and into the recesses from which the prongs were pressed.

3. The process of making a composite rim for ophthalmic mountings comprising preparing a metal rim with recesses and projections, preparing a non-metallic composition that will harden, and applying the composition on the metal rim around the projections and into the recesses.

4. A composite rim for ophthalmic mountings comprising a metallic rim, recesses therein, and a composition non-metallic rim molded around the metallic one and into the recesses therein.

5. A composite rim for ophthalmic mountings comprising a metallic rim, prongs thereon, and a composition non-metallic rim molded around the metallic rim and the prongs.

6. A composite rim for ophthalmic mountings comprising a metallic rim, prongs pressed therefrom, and a composition non-metallic rim molded around the metallic rim and the prongs and into the recesses from which the prongs were pressed.

7. A composite rim for ophthalmic mountings comprising a metallic rim, recesses therein, scores thereon, and a composition non-metallic rim molded around the metallic rim and the scores and into the recesses.

8. The process of making a composite rim for ophthalmic mountings consisting in preparing a metallic rim portion of grooved formation, forming apertures centrally of the groove in said metallic portion, displacing the material adjacent the apertures to provide outwardly deflected prongs, molding a softened composition covering about the outer portion of the metallic member, including the projecting prongs, pressing the parts during the molding operation to force the composition coating into interlocking engagement with the recesses, and subsequently hardening the composition whereby the parts are securely retained in interlocked relation.

In testimony whereof I have affixed my signature in presence of two witnesses.

ELMER L. SCHUMACHER.

Witnesses:
HARRY H. STYLL,
H. K. PARSONS.